United States Patent
Ito (10) Patent No.: US 6,677,991 B1
(45) Date of Patent: Jan. 13, 2004

(54) PORTABLE DISPLAY APPARATUS WITH A REAL-TIME DATA DISPLAY CAPABILITY AND DISPLAY CONTROL METHOD

(75) Inventor: Kenji Ito, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/283,577

(22) Filed: Apr. 1, 1999

(30) Foreign Application Priority Data

Apr. 3, 1998  (JP) .......................................... 10/091279

(51) Int. Cl.[7] .............................................. H04N 5/225
(52) U.S. Cl. .................................... 348/220.1; 358/525
(58) Field of Search ........................... 348/220.1, 222.1, 348/333.01, 273, 280; 358/525, 483; 382/167

(56) References Cited

U.S. PATENT DOCUMENTS

| | | | | | |
|---|---|---|---|---|---|
| 4,750,041 A | * | 6/1988 | Vogel et al. | .............. | 348/220.1 |
| 5,982,984 A | * | 11/1999 | Inuiya | ..................... | 348/220.1 |
| 6,380,973 B1 | * | 4/2002 | Kawahara | ................. | 348/220.1 |
| 6,392,699 B1 | * | 5/2002 | Acharya | ................... | 348/222.1 |
| 6,473,120 B2 | * | 10/2002 | Hirasawa et al. | ......... | 348/220.1 |
| 6,542,192 B2 | * | 4/2003 | Akiyama et al. | ......... | 348/222.1 |

FOREIGN PATENT DOCUMENTS

| JP | A6124073 | 5/1994 |
|---|---|---|
| JP | A6215120 | 8/1994 |

* cited by examiner

*Primary Examiner*—Wendy R. Garber
*Assistant Examiner*—Jacqueline Wilson
(74) *Attorney, Agent, or Firm*—Birch, Stewart, Kolasch & Birch, LLP (57) ABSTRACT

A portable display apparatus selectively operable in a still picture mode or a movie mode includes an operating section for allowing the user of the device to select either one of the two modes. In the movie mode, a synchronous movie processing section relates color data fed and color data to be output on an integral multiple basis and thereby synchronizes input color data and output color data. Void pixels where color data are absent are interpolated to generate a plurality of lines. Consequently, three colors R(red), G (green) and B (blue) are output at the same time in synchronism with a vertical timing as well. Therefore, the generated lines can adequately display a picture alone. Not all the color data are stored or processed, as customary with conventional two field memories, but only necessary lines are used for display. In the still picture mode, the color data fed are temporarily stored. A color data interpolating section executes interpolation with the stored color data to thereby generate a high quality still picture. This makes the most of resolution available with a display and displays a high resolution picture. The display apparatus can therefore fully use power available for a synchronous movie, operates over a long period of time when a portable apparatus including the display apparatus is carried by the user, and thereby noticeably improves the function of the apparatus.

18 Claims, 8 Drawing Sheets

PORTABLE DISPLAY APPARATUS WITH A REAL-TIME DATA DISPLAY CAPABILITY AND DISPLAY CONTROL METHOD

BACKGROUND OF THE INVENTION

1. Field of the Invention

The present invention relates to a portable display apparatus capable of performing real-time display of data fed thereto and a display control method. The portable display apparatus and display control method are advantageously applicable to, e.g., a digital still camera operable in a so-called movie mode.

2. Description of the Background Art

A display apparatus displays data fed thereto on its screen in the form of pixels represented by a group of image points or dots. Increasing the number of dots constituting the screen is successful to enhance image quality while reducing the pitch of dots is successful to enhance resolution, as well known in the art. A single still picture is generated by the dots or pixels. On the other hand, a movie is displayed in the form of a plurality of pictures, which are based on a display standard within a preselected period of time. Display satisfying the display standard is referred to as real-time display processing.

Sophisticated control for the real-time processing has customarily been executed by use of various kinds of devices including high-speed memories. However, such devices in general are difficult to obtain. This, coupled with the fact that access must be repeatedly made to memories for the management of data stored in the memories and for the input and output of data from the memories (e.g. double access), limits the real-time display capability available with the above control.

In light of the above, Japanese Patent Laid-Open Publication No. 124073/1994 proposes a system using low-speed memories for the continuous reproduction of a high quality movie. Also, Japanese Patent Laid-Open Publication No. 215120/1994 teaches a system for solving the double access problem and achieving high performance at low cost. These systems, however, belong to a family of asynchronous movie systems not satisfying the real-time display requirement. The systems taught in the above documents each write data in one of two memories field by field or frame by fame frame while reading data out of the other memory. This kind of procedure once writes data in each memory and therefore delays the display.

A synchronous system, as distinguished from the asynchronous system, directly outputs input data by synchronizing them to a vertical rate necessary for picture display. This system is applied to picture display based on, e.g., a VGA (Video Graphics Array) standard.

A digital still camera or similar miniature portable apparatus extensively used today is often powered by a battery in order to enhance portability. In a still picture mode, a digital still camera or similar image pickup apparatus does not record or reproduce data constantly in or out of a recording medium and has therefore little influence on the life of a battery loaded thereon. It is a common practice with the display apparatus to allow the user to see a scene being picked up on a monitor for rendering the display apparatus convenient to use. In this case, much of power available with the battery is consumed by the reading of signals out of a CCD (Charge Coupled Device) image sensor and the display of the scene on the monitor.

In the power saving aspect, the asynchronous system needs two memories each having a capacity greater than one frame and therefore consumes much power. This kind of system is not feasible for portable apparatuses.

As for the synchronous system capable of saving power, assume that color filters are implemented by a Bayer arrangement by way of example. Then, when signals are sequentially read out of the CCD image sensor, only two signals representative of pixels R (red) and G (green) and only two signals representative of pixels B (blue) and G are available with a first field and a second field, respectively. The prerequisite with color reproduction using the synchronous system is that the three colors R, G and B be output at the same time, so that the synchronous system cannot be simply applied to color reproduction. The synchronous system cannot implement a movie without resorting to memories, which aggravate power consumption.

In recent years, despite the trend toward the miniaturization and power saving of an apparatus, the number of pixels is ever increasing to meet the demand for higher image quality. The increase in the number of pixels will make it impossible to read signals out of pixels picked up within a period of time based on future display standards.

SUMMARY OF THE INVENTION

It is therefore an object of the present invention to provide a display apparatus with a real-time display capability and capable of effecting high quality display while saving power, and a display control method.

In accordance with the present invention, a portable display apparatus for displaying, based on a preselected standard, color data output from an image pickup device having pixels arranged in accordance with color filters respectively assigned to three primary colors R, G and B includes a mode selector for selecting either one of a still picture mode for displaying a single high quality picture by using the color data output from the pixels of the image pickup device and a movie mode for displaying a plurality of pictures by using the color data. A first synchronizing and interpolating circuit adjusts, in the movie mode, a timing in such a relation that the color data fed from the image pickup device and color data to be output are synchronized by an integral multiple, and interpolates void pixels intervening between the pixels of the color data fed to thereby generate a plurality of lines. A memory has a capacity greater than a single frame and temporarily stores, in the still picture mode, the color data fed from the image pickup device. A color data interpolating circuit interpolates the color data output from the memory. The color data output from the first synchronizing and interpolating circuit or the color data interpolating circuit are fed to a display while being synchronized also to a vertical timing different from the relation for synchronization.

Also, in accordance with the present invention, a digital still camera includes the above display device. The camera further includes a recording circuit for recording the output of the first synchronizing and interpolating circuit or the color data interpolating circuit in a recording medium. A reproducing circuit reads data out of the recording medium. The camera displays the output of the first synchronizing and interpolating circuit, the color data interpolating circuit or the reproducing circuit while synchronizing the output to a vertical timing different from a horizontal timing which implements the previously mentioned relation.

BRIEF DESCRIPTION OF THE DRAWINGS

The objects and features of the present invention will become more apparent from the consideration of the following detailed description taken in conjunction with the accompanying drawings in which:

FIG. 2 shows how FIGS. 2A and 2B are combined;

DESCRIPTION OF THE PREFERRED EMBODIMENT

Figure 1:
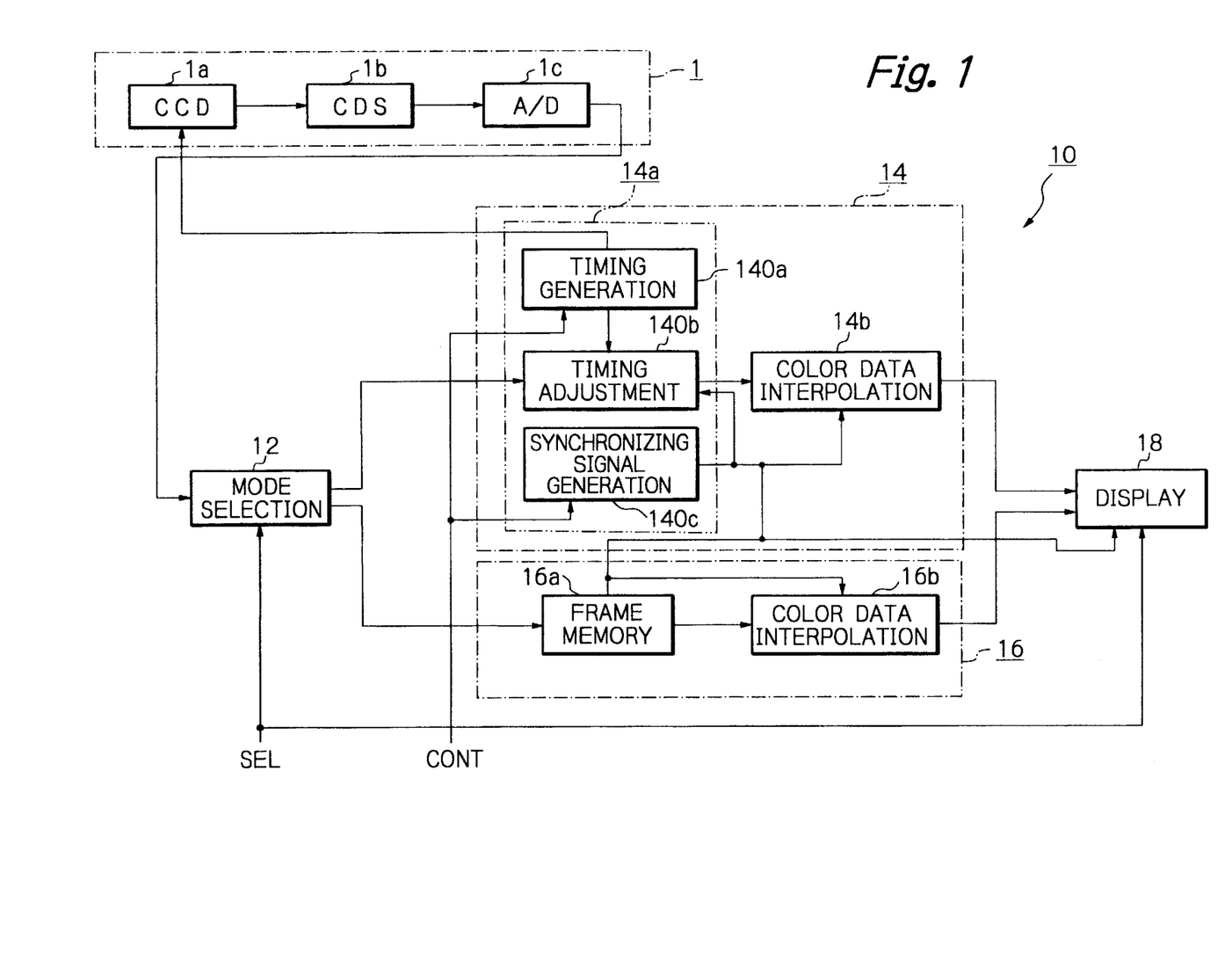
FIG. 1 is a block diagram schematically showing a display device embodying the present invention.

Referring to FIG. 1 of the drawings, a display apparatus embodying the present invention is shown and generally designated by the reference numeral 10. Briefly, the display apparatus 10 is characterized in that it uses memory circuitry for a synchronous movie different from the conventional memory circuitry and adjusts the timing of data input to and output from the memory circuitry to thereby display a synchronous movie. As for a synchronous movie, the display apparatus 10 consumes less power than the conventional display apparatuses and is therefore usable over a longer period of time when applied to a portable apparatus. In the following description, the display apparatus 10 is assumed to be applied to portable equipment by way of example.

As shown in FIG. 1, the display apparatus 10 includes an image pickup section 1 made up of a CCD image sensor 1a, a CDS (Correlation Double Sampling) 1b processing, and an A/D (Analog-to-Digital) converter 1c. An image signal (signal charge) generated by the CCD 1a is, e.g., line-sequentially read out and transferred to the CDS 1b. The CDS processing 1b removes noise ascribable to, e.g., thermal noise from the input image signal and feeds the resulting signal to the A/D converter 1c. The A/D converter 1c converts the input signal to a digital signal and delivers the digital signal to a mode selection 12. In the illustrative embodiment, the digital signal is output in the form of eight-bit parallel data for a single pixel.

The display apparatus 10 executes various kinds of processing with the digital signal output from the image pickup section 1 and displays the resulting image on a display 18. For this purpose, the display apparatus 10 includes a synchronous movie processing section 14 and a still picture processing 16 in addition the mode selection 12 and display 18. A controller, not shown, controls such structural elements of the display apparatus 10.

The mode selection 12 selects a mode in which the display apparatus 10 should operate and input by the user of the portable apparatus on a switch, not shown, which may be provided on the casing of the apparatus. A select signal SEL representative of the mode selected by the user is input to the mode selection 12. The select signal SEL is fed also to the display 18 for signal selection, which will be described later specifically.

The synchronous movie processing section 14 is generally made up of input/output adjusting circuitry 14a and a color data interpolation 14b. The input/output adjusting circuitry 14a includes a timing generation 140a, a timing adjustment 140b, and a synchronizing signal generation 140c. The adjusting circuitry 14a synchronizes the input of color data from the mode selection 12 and the output of the color data while producing color data for interpolation.

In the above adjusting circuitry 14a, the timing generation 140a generates, in accordance with a control signal CONT output from the controller, a drive signal for the CCD image sensor 1a and various control signals for the timing adjustment 140b which will be described later. The synchronizing signal generation 140c also operates in accordance with the control signal CONT. The synchronizing signal generation 140c outputs synchronizing signals for the display 18, e.g., a horizontal and a vertical synchronizing signal customary with the current broadcasting system. For example, as for an NTSC (National Television System Committee) system, a horizontal synchronizing signal $f_h$ and a vertical horizontal signal $f_v$ have frequencies of 15.734266 kHz and 60 Hz, respectively. As for the display of 640×240 pixels, the drive signal fed from the timing generation 140a to the image sensor 1a causes data to be read out at a frequency two times as high as the frequency of the horizontal synchronizing signal $f_h$, as will be described specifically later. The synchronizing signal generation 140c delivers a synchronizing signal to the still picture processing 16 as well.

Figure 2:
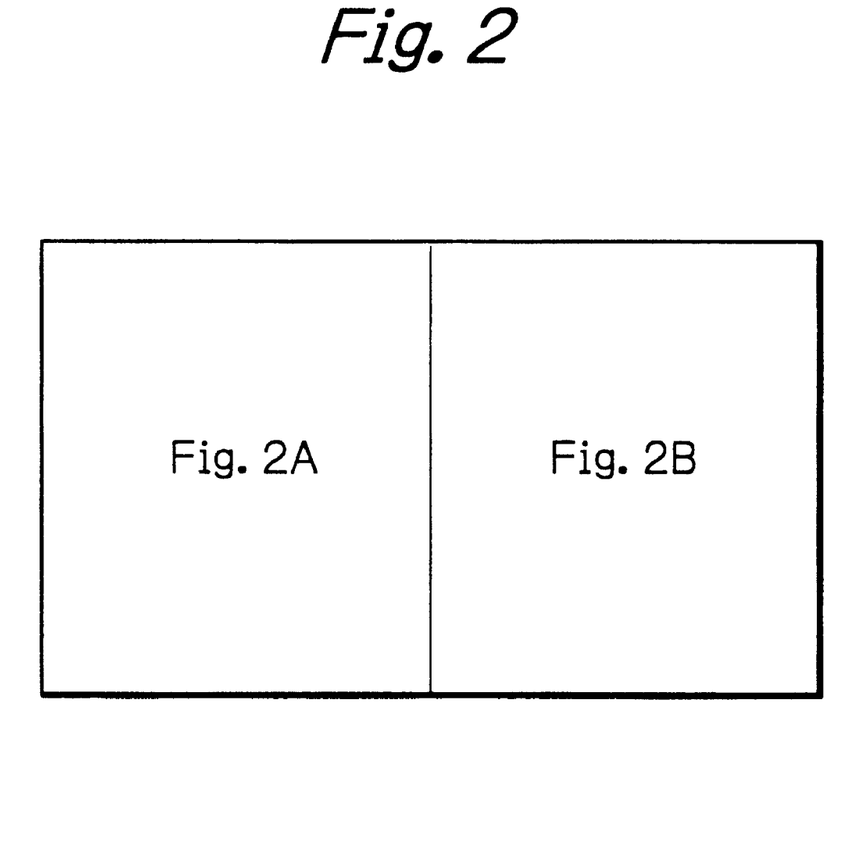
Figure 2A:
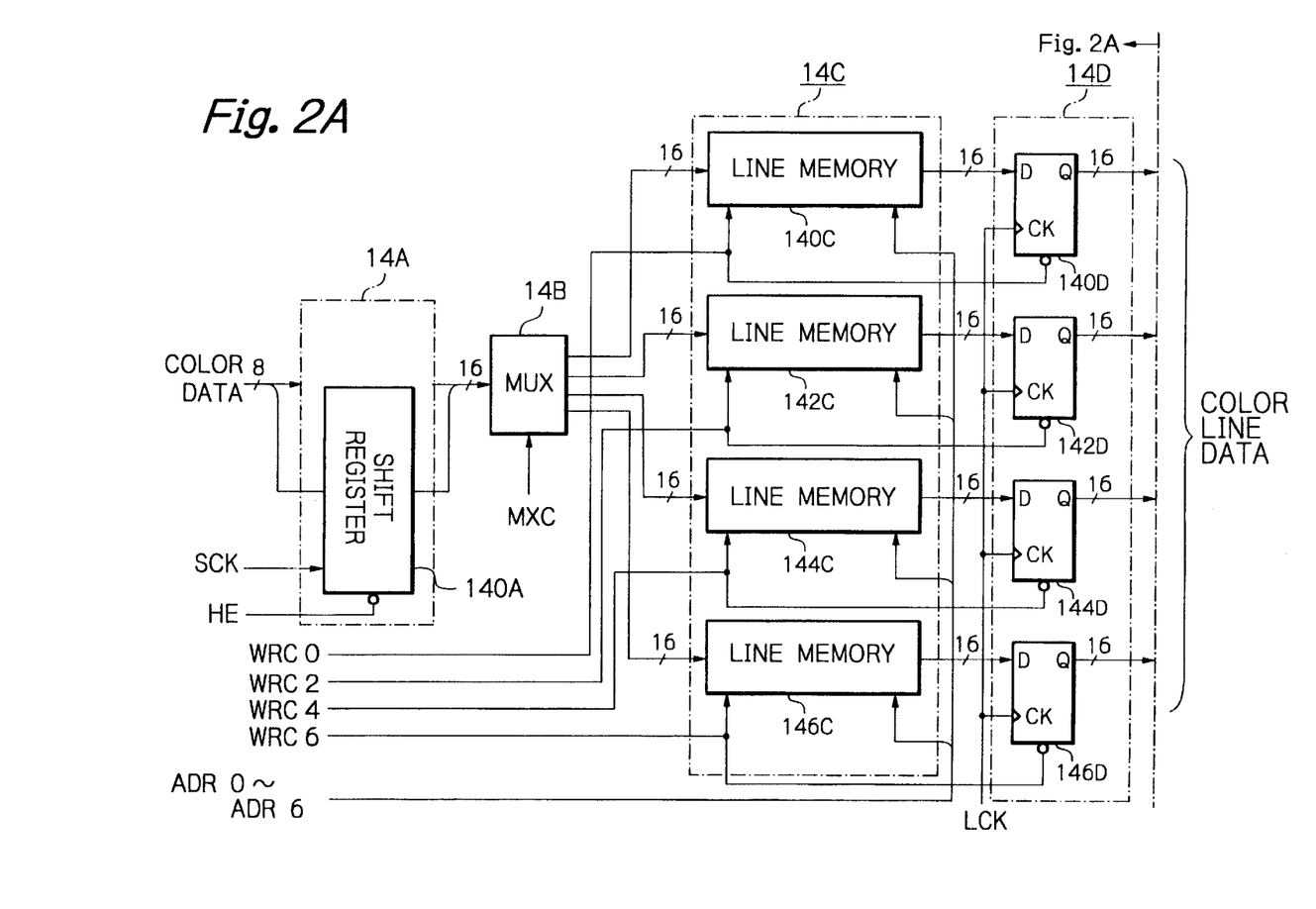
FIGS. 2A and 2B are schematic block diagrams respectively showing a specific configuration of a timing adjusting section and a specific configuration of a color data interpolating section and a display included in the illustrative embodiment.

FIG. 2A shows a specific configuration of the timing adjustment 140b used to process the input color data. As shown, the timing adjustment 140b includes a sampling section 14A, multiplexing circuitry (MUX) 14B, a line memory section 14C, and a data latch section 14D. To cause three colors R, G and B to appear at the same time with a Bayer arrangement, it is necessary to handle two consecutive lines of data input to the timing adjustment 140b as a single line. For this purpose, the sampling section 14A includes a shift register 140A and stores one line of color data subjected to preprocessing and having eight bits for a single pixel in the shift register 140A. An enable signal HE synchronous to the horizontal synchronizing signal $f_h$ is input to the shift register 140A. The shift register 140A starts storing one line of color data in synchronism with a horizontal drive signal HD for the CCD image sensor 1a and stores it only when the enable signal HE is in, e.g., a low level. Also, the shift register 140A outputs one line of color data stored just before the above one line of data when the enable signal HE is in, e.g., a high level. Specifically, the shift register 140A stores the color data fed in synchronism with a sampling clock SCK, delays them, and then outputs the delayed color data. Consequently, one line of color data output from the shift register 140A and one line of color data currently fed from the image pickup section 1, i.e., sixteen bits of color data in total are delivered to the MUX 14B.

Figure 3A:
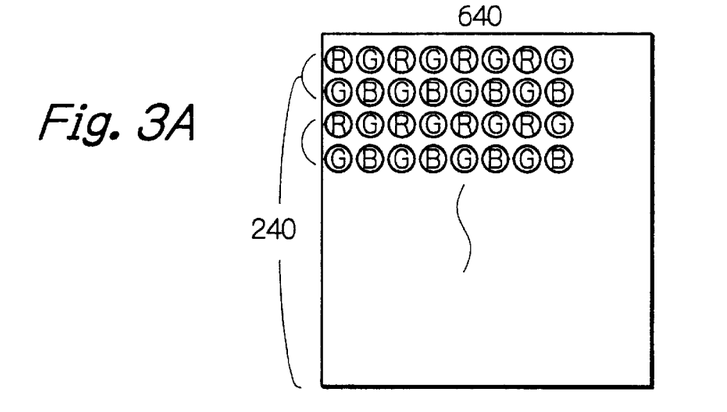
FIGS. 3A, 3B and 3C show a positional relation between color data derived from the construction shown in FIG. 1, void pixels where color data are absent, and YC (luminance and chrominance) processing.

Of course, the CCD image sensor 1a of the image pickup section 1 is of the type outputting all the pixels of two consecutive lines at the same time, then the sampling section 14A is not necessary. As stated above, in the illustrative embodiment, one line is represented by two consecutive lines of color data output from the CCD 1a and based on the VGA standard. This is equivalent to feeding VGA standard color data corresponding to 640×240 dots, but halved in the vertical direction. FIG. 3A shows the resulting pixel arrangement.

The MUX 14B delivers two lines of color data (GRGRGR . . . /BGBGBG . . . ) having sixteen bits in total to each of four line memories 140C, 142C, 144C and 146C constituting the line memory section 14C. The MUX 14B operates in accordance with a MUX control signal MXC fed from the controller. Should the sixteen-bit color data be directly input to the line memory section 14C, demultiplexing circuitry (DEMUX) 141b, which will be described later with reference to FIG. 2B, would have to execute sophisticated data processing.

The MUX 14B may be constructed to write two lines of pixels G and R or two lines of pixels B and G in a single line memory. In the illustrative embodiment, the MUX 14B includes two shift registers respectively assigned to the pixels G and R and the pixels B and G, although not shown specifically. The MUX 14B therefore stores two lines of pixels (GRGRGR . . . /BGBGBG . . . ) input first, stores the next two lines of pixels, and multiplexes the four lines of pixel data in total. As a result, two lines of pixels G and R and two lines of pixels B and G are formed. Two lines of pixels "GRGRGR . . . /GRGRGR . . . " and two lines of pixel data "BGBGBG . . . /BGBGBG . . . " are written to the line memories 140C and 142C, respectively.

In the case where two of the line memories 140C–146C of the line memory section 14C are operated at a time, as will be described later with reference to FIG. 4, the MUX 14B and each of the line memories 140C–146C are connected by a sixteen-bit data bus. However, the line memories 140C–146 each have a 640 words×8 bits×2 configuration. The color data separated by the MUX 14B are fed to the line memories line by line, i.e., in the form of a group of eight upper bits and a group of eight lower bits of the same pixels. Such color data are read out of the line memories at the same time.

For the above reason, two of the line memories 140C–146C and the other two of the same are assigned to the lines of pixels G and R and the lines of pixels B and G, respectively. Write/read control signals WRC0–WRC6 and address signals ADR0–ADR6 are fed to the line memories 140C–1460, respectively; the operation timings of the line memories 140C–146C will be described specifically later. It follows that each two of the line memories 140C–146C assigned to the upper eight bits and lower eight bits, respectively, have a capacity 4 of 640 words×16 bits.

The data latch section 14D has four latches 140D, 142D, 146D and 146D connected to the line memories 140C–146C, respectively. A latch clock LCK is fed to the latches 140D–146D. The latches 140D–146D respectively latch the color data input from the associated line memories 140C–146C in synchronism with the latch clock LCK and then feeds them to the color data interpolation 14b, FIG. 1. The data latched and then output are two different kinds of color line data, i.e., GB and RG.

A specific configuration of the color data interpolation 14b will be described with reference to FIG. 2B. As shown, the color data interpolation 14b includes latches 143b and 147b, an adder 145b and switches SW1 and SW2 in addition to the DEMUX 141b mentioned earlier. The DEMUX 141b separates the sixteen-bit G and R color line data and sixteen-bit B and G color line data to thereby produce three colors R, G and B in accordance with a demultiplex control signal DMXC fed from the controller.

Specifically, the DEMUX 141b separates the sixteen-bit G and R color line data fed from the latch 140D and thereby produces two eight-bit sequences of color data "_R_R_R . . . ". It is to be noted that the symbol "_" is representative of positions where the pixels G were lost due to demultiplexing. One of the two sequences of color data is directly applied to a terminal a included in the switch SW1 while the other sequence is fed to the latch 143b. A compensation clock CCK causing the latch 143b to play the role of a one-pixel delay device is fed to the latch 143b. The latch 143b delays the input sequence of color data by one pixel and outputs the delayed sequence to a terminal b also included in the switch SW1. The switch SW1 selects the terminals a and b alternately on a pixel basis. As a result, 320 pixels of color data directly applied to the switch SW1 and 320 pixels of color data applied to the switch SW1 via the delay 143b are combined. The switching operation of the switch SW1 occurs at a period two times as long as the period of the sampling clock SCK used to take in the pixels, i.e., at a frequency one-half of the frequency of the sampling clock SCK. Let this signal be labeled ½SCK. By the above procedure, the outputs of the latch 143b are sequentially inserted in the positions represented by "_" completing 640 pixels of color data R.

Likewise, the DEMUX 141b separates the sixteen-bit B and G color line data output from the latch 142D and produces two eight-bit sequences of color data "B_B_B . . . ". 320 delayed color data output from the latch 147b are sequentially inserted in the positions "_" corresponding to G by the switch SW2, completing 640 pixels of color data. As for the pixels G, the DEMUX 141b separates eight bits of color data G from each of the lower eight bits of G and R color line data output from the latch 140D and the upper eight bits of B and G color line data output from the latch 142D. The resulting color data "G_G_G . . . /_G_G_G . . . " are applied to the adder 145b. In this manner, addition suffices alone because the positions of the pixels G are not coincident due to the Bayer arrangement. The adder 145b may be replaced with a switch in order to accurately reflect the relation between the data and the position of the individual pixel G.

As for the number of lines, one line of color data of the pixels R and G are fully interpolated by four lines in total, so that only 120 lines can be displayed. Another one line is interpolated by the display of the same data. This can be done if the interpolated color data are fed to a one-line shift register and output through, e.g., without any delay at the same time, as will be described specifically later. As a result, the number of display lines is matched to 240 lines in total. This processing attaches importance to horizontal resolution and reduces the actual vertical resolution to one-fourth. Nevertheless, color data having a desirable correlation are achievable if they are selected in consideration of the spatial positional relation.

Figure 3B:
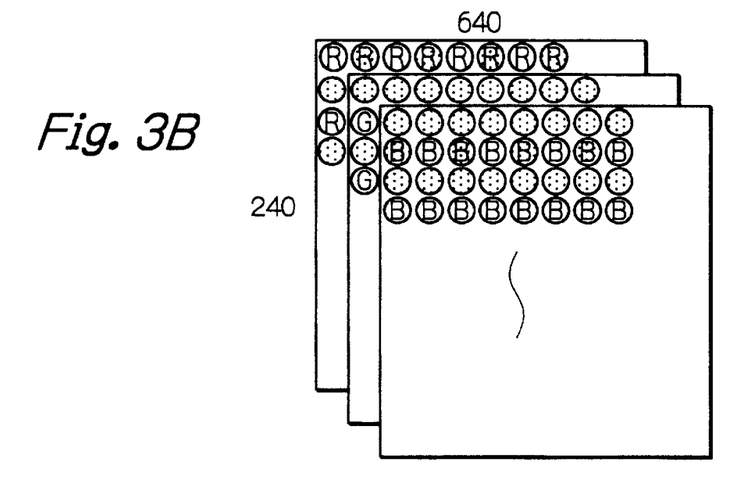

FIG. 3B shows the color data R, G and B produced by the above procedure. In FIG. 3B, pixels represented by circles with dots are the interpolated pixels. The color data interpolation 14b delivers the pixels of FIG. 3B to the display 18. Color data are also fed from the still picture processing 16 to the display 18. However, an arrangement for switching the color data output from the color data interpolation 14b and the color data output from the still picture processing 16 is not shown for the simplicity of illustration. The following description will concentrate on an arrangement for processing the color data output from the color data interpolation 14b.

Figure 3C:
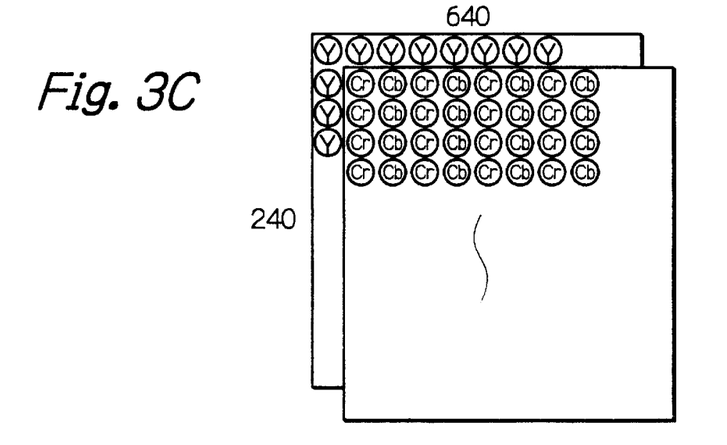

The display 18 executes signal processing with the R, G and B data input from the color data interpolation 14b and outputs a video signal on its display section not shown. To output the video signal, the display 18 includes a YC conversion 18a, an encoder 18b, and a digital-to-analog (D/A) converter 18c. The YC conversion 18a converts the color data R, G and B to a luminance signal Y and a chrominance signal, more specifically chrominance signals $C_r=(R-Y)$ and $C_b=(B-Y)$. As for the NTSC system, such conversion can be readily done by substituting the color data R, G and B for equations. FIG. 3C shows the resulting color data Y, $C_r$ and $C_b$.

The encoder 18b transforms the luminance signal Y and chrominance signal C, which are component signals based on the NTSC system by way of example, to a composite signal. The D/A converter 18c converts the composite signal output from the encoder 18b to an analog video signal and feeds the video signal to the display section.

Referring again to FIG. 1, the still picture processing 16 for displaying a still picture includes a frame memory 16a and a color data interpolation 16b. The frame memory 16a is capable of storing at least one frame of color data output from the mode selection 12. The color data interpolation 16b interpolates void pixels of the color data ascribable to the Bayer arrangement and existing between pixels where color data are present. To produce values for the void pixels, the color data interpolation 16b proportionally distributes the existing color data or multiplies each color data with a particular weighting coefficient. In this manner, the still picture processing 16 produces R, G and B data by use of the frame memory 16a and delivers them to the display 18. It will therefore be seen that the conventional synchronous movie mode is the extension of this kind of still picture processing.

In practice, the still picture processing 16 uses a plurality of frame memories for performing calculations and therefore consumes relatively great power. By contrast, the synchronous movie processing 14 does not need mass memories, but needs only line memories and controls them to generate three colors R, G and B at the same time, consuming a minimum of power. Consequently, the display apparatus 10 extends the life of a battery, compared to the conventional display apparatuses.

Figure 4:
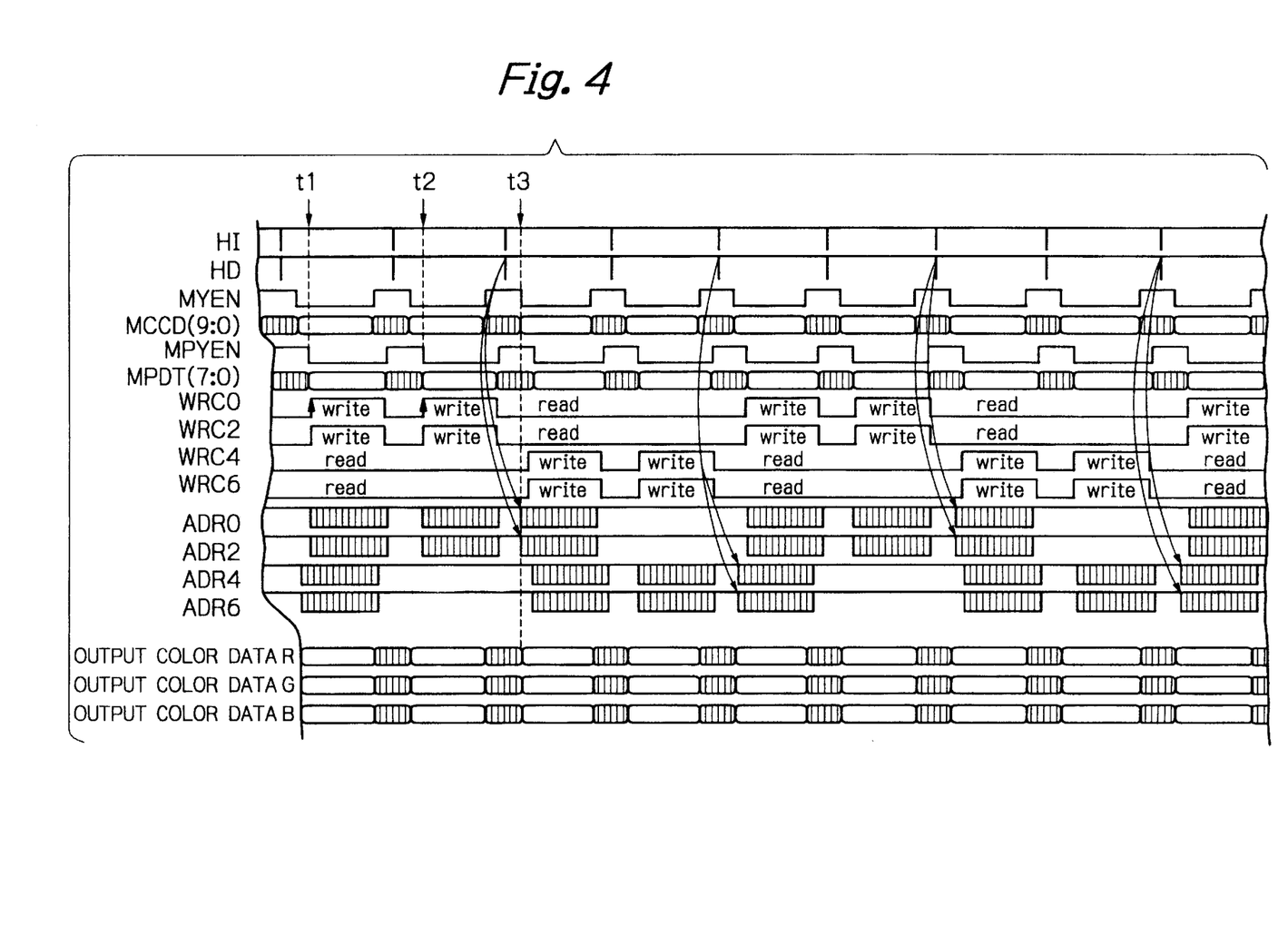
FIG. 4 is a timing chart demonstrating a specific operation of the illustrative embodiment.

Reference will be made to FIG. 4 for describing a specific operation of the display apparatus 10. There are shown in FIG. 4 an input horizontal synchronizing signal HI indicative of a timing for starting reading a signal out of the CCD image sensor 1a, and an output horizontal synchronizing signal HD identical with the horizontal synchronizing signal of the current broadcasting system. Various kinds of processing are executed with the color data in synchronism with the synchronizing signals HI and HD. The timing generation 140a feeds to the image sensor 1a pickup data enabling signal MYEN as one of drive timings, thereby synchronizing the image sensor 1a to the input horizontal synchronizing signal HI. It is to be noted that the synchronizing signal HI has a frequency two times as high as the frequency of the output horizontal synchronizing signal HD, although not shown specifically. While the pickup data enabling signal MYEN is in a low level, the reading of data out of the image sensor 1a is enabled. The pickup data are, e.g., ten-bit data labeled MCCD (9:0) in FIG. 4.

The data read out of the image sensor 1a are subjected to pre-processing with the result that the pickup data enabling signal MYEN turns out a pre-processed pickup data enabling signal MPYEN at a time t1. By the pre-processing, the ten-bit pickup data MCCD are transformed to eight-bit data MPDT (7:0). At this instant, the sampling section 14A transforms the eight-bit data MPDT (7:0) to sixteen-bit color data. Eight bits of the sixteen-bit color data and the other eight bits of the sixteen-bit color data are respectively fed to the line memories 140C and 142C via the MUX 14B. To produce sixteen-bit color data, the next sixteen-bit data MPDT (7:0) are fed to the line memories 140C and 142C, eight bits each, via the sampling section 14A and MUX 14B in synchronism with the next input horizontal synchronizing signal HI. Therefore, the write/read control signals WRC0 and WRC2 input to the line memories 140C and 142C, respectively, are held in a high level, i.e., a write enable state from the time t1 to the time t2.

Subsequently, the above write/read control signals WRC0 and WRC2 go low in response to an output horizontal synchronizing signal HD, enabling the reading of data out of the line memories 140C and 142C. At the same time, addresses ADR0 and ADR2 are fed to the line memories 140C and 142C, respectively. As a result, the color data are read out of the line memories 140C and 142C and immediately delivered to the latches 140D and 142D, respectively, and therefrom to the color data interpolation 14b. The DEMUX 141b of the color data interpolation 14b separates the color data of the pixels corresponding to the pixels G and R and the pixels B and G at a high speed color by color, although not shown specifically in FIG. 4. At this instant, the DEMUX 141b outputs upper eight bits and lower eight bits of each color separately, as shown in FIG. 2B. That is, one of the upper bits of data and lower bits of data is delayed and then combined with the other data in order to interpolate the void pixels, thereby completing 640 pixels of eight-bit color data. The color data interpolation 14b simultaneously outputs the three colors R, G and B at a time t3.

Figure 2B:
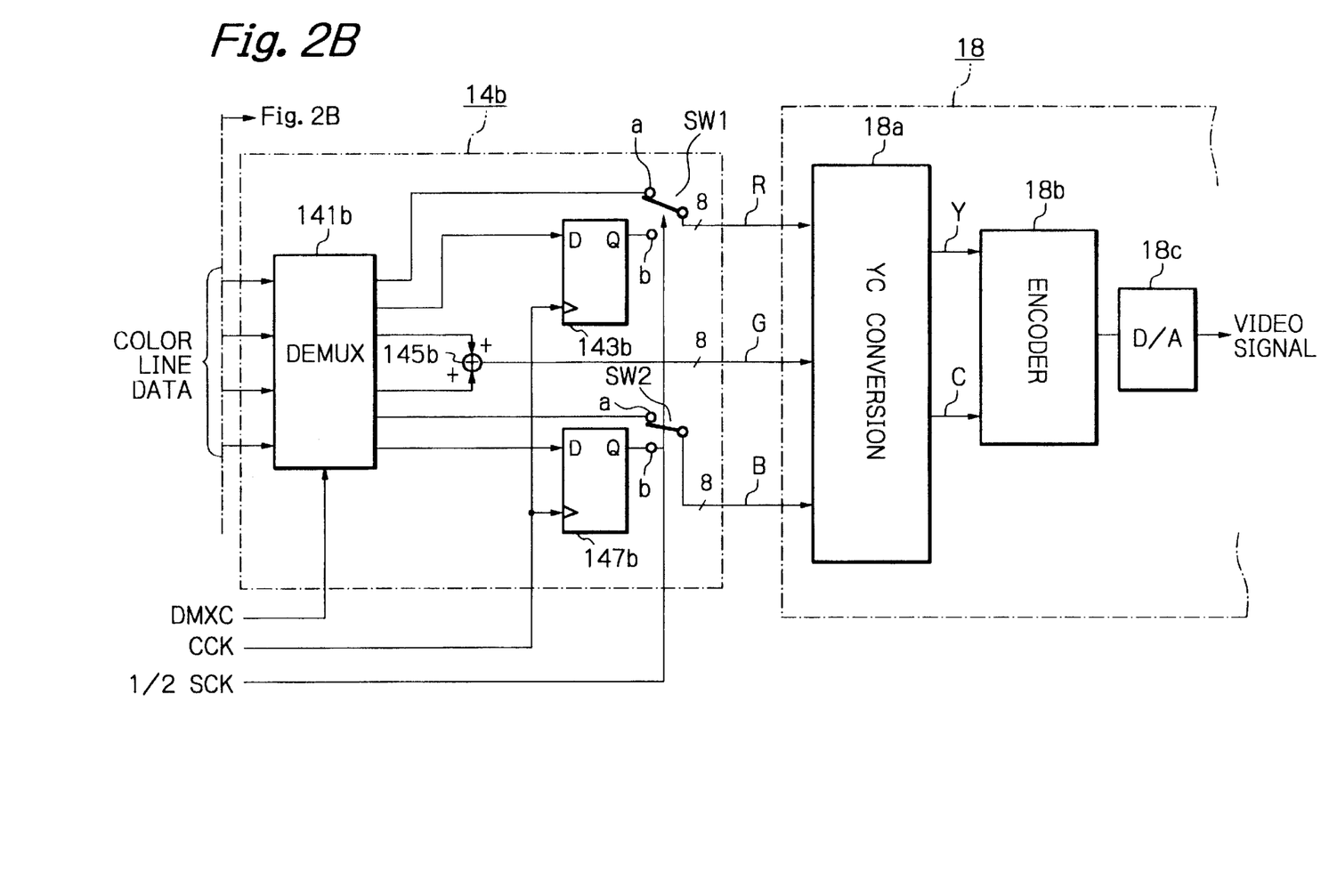

The color data interpolation 14b shown in FIG. 2B includes a line interpolating section, not shown, for directly outputting the three color data R, G and B and identical in construction with, e.g., the shift register 140A of the sampling section 14A, FIG. 2A. With the line interpolating section, the interpolation 14b outputs one line of color data and then outputs one line of the same color data; otherwise, the display 18 would display the signal on a 640×120 pixel basis in the VGA standard system because the display apparatus 10 produces one line of color data from four lines. The above configuration is successful to solve this problem although it slightly lowers vertical resolution. Consequently, the interpolation 14b is capable of outputting color data on a 640×240 pixel basis, As shown in FIG. 4, during the interval between the times t1 and t2, the write/read control signals WRC4 and WRC6 input to the other two line memories 144C and 146C, respectively, are held in a low level, i.e., in a read enable state. Color data area therefore read out of the line memories 144C and 146C while color data are written to the line memories 140C and 142C. Consequently, color data are output from the line memories 140C–146C without interruption. At the same time, the display apparatus 10 causes the vertical synchronizing signal to be output at a rate of 1/60 (s). This can be done because the input to the display apparatus 10 and the output from the same are fully synchronized by the timing generation 140a and synchronizing signal generation 140c. For example, as for high definition display, when 1280×1024 pixels are read out at a rate of 1/15 (s) and if the display apparatus 10 should display the vertical synchronizing signal at the rate of 1/60 (s), then a synchronous movie can be implemented by 256 lines.

Figure 5:
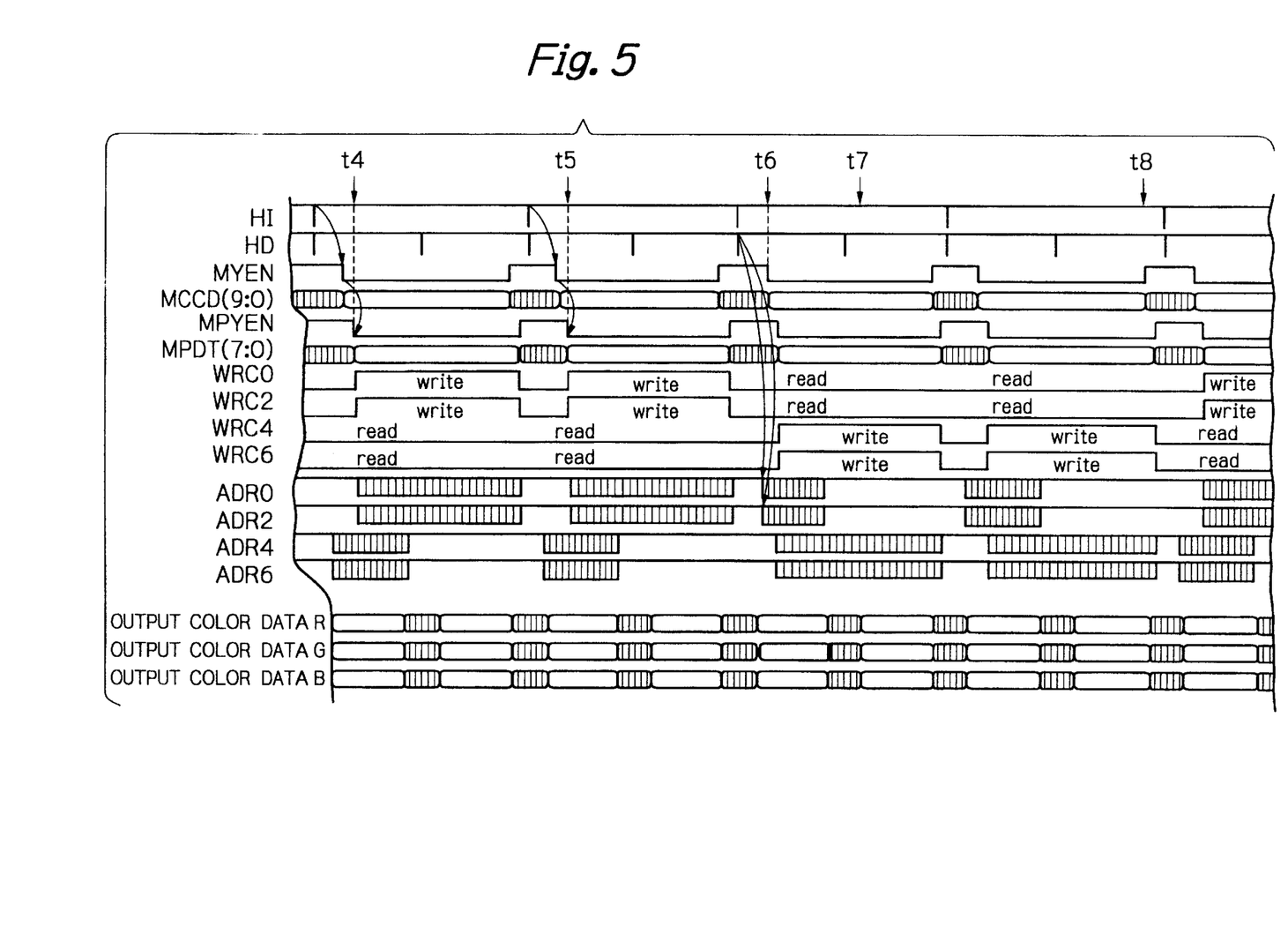
FIG. 5 is a timing chart showing a specific operation of a modification of the illustrative embodiment.

A modification of the illustrative embodiment will be described hereinafter which is applied to an SXGA (Super eXtended Graphics Array) standard. It is to be noted that the SXGA standard has a number of pixels two times as great as the number of pixels of the VGA standard described previously. The modification is also practicable with the construction described above. A specific operation of the modification will be described with reference to FIG. 5. Assume that 1280×120 pixels at the input side are synchronized to 640×240 pixels at the output side by the 1/60 (s) vertical synchronizing signal.

When the input transfer rate and output transfer rate of the display apparatus 10 have the same frequency, a period of time for horizontal transfer necessary with the SXGA standard is obviously two times as long as a period of time necessary with the VGA standard. In this case, the color data are classified into two sequences of eight-bit data by the sampling section 14A and MUX 14B in response to the input horizontal synchronizing signal HI. The two sequences are then respectively written to the line memories 140C and 142C, so that sixteen-bits of pixels G and R and sixteen-bits of pixels B and G are respectively completed in the line memories 140C and 142C. In FIG. 2A, the connection between the MUX 14B and the line memory section 14C is illustrated functionally; the MUX 14B feeds color data corresponding to the kind of a line to the line memory section 14C, eight bits at a time.

A read access to the line memory 140C begins in synchronism with the output horizontal synchronizing signal (see ADR0 at a time t6, FIG. 5) such that, among the pixels G and R, the color data written to the line memory 140C at a time t4 are read out. At the same time, a read access to the line memory 142C also begins with the result that the color data of pixels B and G are read out of the line memory 142C. The DEMUX 141b separates the color data read out of the line memory 140C to thereby produce G color data and R color data. In this modification, 640 R pixels are available and make it needless to effect interpolation by using color data read out. The color interpolation 14b directly outputs, e.g., the upper eight bits of pixels R and then outputs, at a time t7, color data R in synchronism with the next output horizontal synchronizing signal HD by using a shift register, not shown, as in the illustrative embodiment. The line memory 142C is operated in the same manner as the line memory 140C, so that two lines of color data B are output by color separation.

As for the pixels G, 640 pixels are output from each of the line memories 140C and 142C. The DEMUX 141b therefore handles the color data G output at, e.g., the time t6 as color data $G_r$ output from the line memory 140C and handles the color data G output at the time t7 as color data $G_b$ output from the line memory 142C.

When the input horizontal synchronizing signal HI is fed at a time t5, color data are also written to the line memories 140C and 142C. In response to the output horizontal synchronizing signal HD, the lower eight-bit color data are output from each of the line memories 140C and 142C. In this manner, three colors R, G and B are simultaneously output between the times t6 and t8, i.e., when the output horizontal synchronizing signal HD(=HO) appears over four consecutive lines. The three colors R, G and B are derived from color data output from the CCD image sensor 1a over two horizontal periods each corresponding to 1,280 pixels. It will therefore be seen that the display apparatus 10 can implement a synchronous movie.

To synchronize display of different standards by a single vertical synchronizing signal whose frequency is, e.g., 1/60 (s), a decrease in the number of pixels in the vertical direction, or thinning, must be taken into account. In the case of the XVGA standard usually displaying a picture at the frequency of 1/15 (s), a period of time necessary for the horizontal 1,280 pixels of 1,280×960 pixels to be directly output at the frequency of 1/60 (s) is doubled. In addition, the number of pixels in the vertical direction must be reduced to one-eighth equivalent to a four-times higher operation rate in the vertical direction. The resulting number of pixels in the vertical direction is 120.

Therefore, when 1,280×120 pixels should be displayed in the form of 640 pixels based on the VGA standard, it is necessary to reduce the number of pixels by ½ horizontally and by ¼ vertically. Consequently, a synchronous movie is displayed by 640×240 pixels.

As stated above, the display apparatus 10 outputs thee colors R, G and B at the same time via the line memories and thereby implements a synchronous movie despite the Bayer arrangement. The display apparatus 10 needing only a minimum number of units including the line memories and controller noticeably reduces power necessary for a synchronous movie, compared to the conventional frame memory scheme.

The illustrative embodiment is practicable not only with the Bayer arrangement or pattern shown and described, but also with a G stripe, RG full checker pattern. Even with the G stripe, RG full checker pattern, a synchronous movie is achievable if void pixels are interpolated by the RGB interpolation system, if the input and output horizontal synchronizing signals are related to each other by an integral multiple, and if color data are output in synchronism with the vertical synchronizing signal. In this case, a single line includes the R, G and B pixels and successfully replaces two lines particular to the Bayer pattern scheme.

Figure 6:
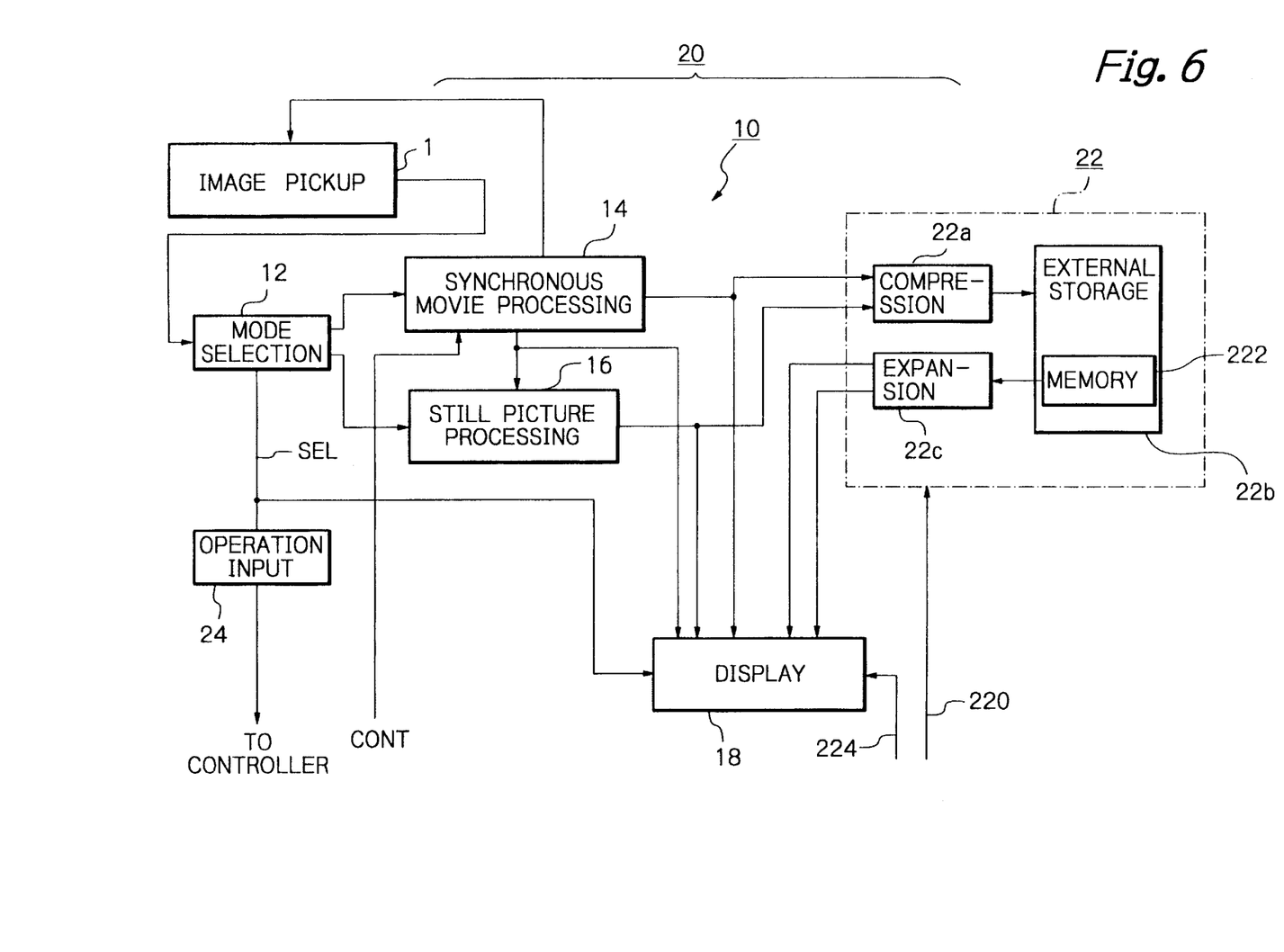
FIG. 6 is a block diagram schematically showing a digital still camera to which the illustrative embodiment is applied.

Referring to FIG. 6, a digital still camera to which the illustrative embodiment is applied will be described. As shown, the digital still camera, generally 20, includes a recording and reproducing section 22 and an operation input 24 in addition to the display apparatus 10. The display apparatus 10 is constructed and operated in exactly the same manner as in the illustrative embodiment and will not be described specifically.

The recording and reproducing section 22 includes a compression 22a for compressing data input to the section 22. An external storage 22b is used to record compressed data output from the compression 22a or read them out, as needed. An expansion 22c expands the data read out of the storage 22b. The controller, not shown, delivers various kinds of control signals 220 including timing signals and address signals to the recording and reproducing section 22.

The compression 22a receives the three coincident color signals R, G and B output form the synchronous movie processing section 14 or the output of the still picture processing section 16 under the control signals 220. The compression 22a executes particular compression with each of the two kinds of color data. For example, the compression 22a may execute optimal processing in accordance with time by varying the degree of compression.

The external storage 22b includes a semiconductor memory 222. To stored mass digital data, the storage 22b may be implemented by a magnetooptical recording unit. The storage 22b is removably mounted to the camera 20. To enhance the portability of the camera 22, a bulky unit may be dismounted so as to write data only in the semiconductor memory 222.

The expansion 22c expands the color data read out of the storage 22b with a procedure opposite to the procedure of the compression 22a and feeds the expanded color data to the display 18.

The operation input 24 delivers the select signal SEL designating either one of the movie mode and still picture mode to the mode selection 12 and display 18. In addition, the operation input 24 includes a switch for causing the display 18 to display either one of the data output from the image pickup section 1 and the data output from the recording and reproducing section 22. The output of this switch is sent to the controller. The controller sends control signals 224 to the display 18 in accordance with the above signals.

The camera 20 is capable of selecting either one of the image pickup section 1 and recording and reproducing section 22 and selectively displaying a movie or a still picture on the display 18. The camera 20 is, in many cases, held in a stand-by state for constantly displaying a picture on the monitor mentioned earlier, so that the user will not lose a shooting chance. To maintain the stand-by state, it is necessary to extend the life of the battery by increasing power available with the battery or reducing current consumption. For this purpose, a still picture may be displayed at the intervals of several seconds to several ten seconds in a stand-by mode. The stand-by mode is selected by the user on the operation input 24. A signal representative of the stand-by mode is also fed from the operation input 24 to the controller. In response, the controller conditions the various sections of the camera 20 for the stand-by mode.

In a pickup mode beginning with shooting and ending with recording, the scene must be continuously displayed in order to allow the user to shoot it at any desired moment. For such real-time movie display, the user selects the pickup mode on the operation input 24. For example, the camera 20 using the display apparatus 10 is operable in the synchronous movie mode with the plurality of line memories. When use is made of the Bayer arrangement and VGA standard, a picture with 640×240 pixels is continuously displayed. This can be done by using only four line memories replacing the conventional two field memories, as stated previously. As a result, a significant decrease in current consumption is achievable and extends the life of the battery. The camera 20 can therefore, e.g., display a picture over a longer period of time even in the pickup mode which is required to continuously display a picture. This enhances the portability of the camera 20.

While the above description has concentrated on a digital still camera, the present invention is, of course, similarly applicable to any other portable apparatus.

The entire disclosure of Japanese patent application No. 91279/1998 filed Apr. 3, 1998 including the specification, claims, accompanying drawings and abstract of the disclosure is incorporated herein by reference in its entirety.

While the present invention has been described with reference to the illustrative embodiment, it is not to be restricted by the embodiment. It is to be appreciated that those skilled in the art can change or modify the embodiment without departing from the scope and spirit of the present invention.

What is claimed is:

1. A portable display apparatus for displaying, based on a preselected standard, color data output from an image pickup device having pixels arranged in accordance with color filters respectively assigned to three primary colors R, G and B, said portable display apparatus comprising:

a mode selector for selecting either one of a still picture mode for displaying a single high quality picture by using the color data output from the pixels of the image pickup device and a movie mode for displaying a plurality of pictures by using said color data;

a first synchronizing and interpolating circuit for adjusting, in the movie mode, a timing in such a relation that the color data fed from the image pickup device and color data to be output are synchronized by an integral multiple, and interpolating void pixels intervening between the pixels of said color data fed to thereby generate a plurality of lines;

a memory having a capacity greater than a single frame for temporarily storing, in the still picture mode, the color data fed from the image pickup device; and a color data interpolating circuit for interpolating the color data output from said memory, wherein the color data output from said first synchronizing and interpolating circuit or said color data interpolating circuit are fed to a display while being synchronized also to a vertical timing different from said relation for synchronization.

2. A portable display apparatus in accordance with claim 1, wherein said first synchronizing and interpolating circuit comprises:

a sampling circuit for sampling one line at a time in response to a first synchronizing signal representative of a timing for taking in the color data fed from the image pickup device;

an output selecting circuit for selecting a destination to which an output of said sampling circuit should be delivered;

an input and output adjusting circuit for storing the color data output from said output selecting circuit and outputting said color data at an adjusted timing; and a second synchronizing and interpolating circuit for interpolating, based on an output of said input and output adjusting circuit, color data at positions of void pixels and outputting resulting interpolated color data in synchronism with a second synchronizing signal, wherein the color data output from said second synchronizing and interpolating circuit are displayed in synchronism with a third synchronizing signal.

3. A portable display apparatus in accordance with claim 2, wherein said input and output adjusting circuit comprises:

an input timing generating circuit for generating a drive timing for driving the image pickup device;

a timing adjusting circuit for further adjusting a timing of a signal generated by a drive of the image pickup device; and a synchronizing signal generating circuit for feeding an output timing for said second synchronizing and interpolating circuit.

4. A portable display apparatus in accordance with claim 3, wherein said input timing generating circuit generates said drive timing over two consecutive lines when the color filters have a Bayer arrangement.

5. A portable display apparatus in accordance with claim 2, wherein said first synchronizing signal and said second synchronizing signal respectively comprise an input and an output horizontal synchronizing signal included in a prescribed system and are related to each other by an integral multiple, said third synchronizing signal comprising a vertical synchronizing signal included in said prescribed system.

6. A digital still camera comprising:

a display apparatus for displaying, based on a preselected standard, color data output from an image pickup device having pixels arranged in accordance with color filters respectively assigned to three primary colors R, G and B, said display apparatus comprising:

a mode selector for selecting either one of a still picture mode for displaying a single high quality picture by using the color data output from the pixels of the image pickup device and a movie mode for displaying a plurality of pictures by using said color data;

a first synchronizing and interpolating circuit for adjusting, in the movie mode, a timing in such a relation that the color data fed from the image pickup device and color data to be output are synchronized to each other by an integral multiple, and interpolating void pixels intervening between the pixels of said color data fed to thereby generate a plurality of lines;

a memory having a capacity greater than a single frame for temporarily storing, in the still picture mode, the color data fed from the image pickup device; and a color data interpolating circuit for interpolating the color data output from said memory, said display apparatus feeding the color data output from said first synchronizing and interpolating circuit or said color data interpolating circuit to a display while synchronizing said color data also to a vertical timing different from said relation for synchronization;

a recording circuit for recording an output of said first synchronizing and interpolating circuit or said color data interpolating circuit in a recording medium; and a reproducing circuit for reading data out of the recording medium, said digital still camera displaying an output of said first synchronizing and interpolating circuit, said color data interpolating circuit or said reproducing circuit while synchronizing said output to a vertical timing different from a horizontal timing which implements said relation.

7. A camera in accordance with claim 6, wherein said first synchronizing and interpolating circuit comprises:

a sampling circuit for sampling one line at a time in response to a first synchronizing signal representative of a timing for taking in the color data fed from the image pickup device;

an output selecting circuit for selecting a destination to which an output of said sampling circuit should be delivered;

an input and output adjusting circuit for storing the color data output from said output selecting circuit and outputting said color data at an adjusted timing; and a second synchronizing and interpolating circuit for interpolating, based on an output of said input and output adjusting circuit, color data at positions of void pixels and outputting resulting interpolated color data in synchronism with a second synchronizing signals, said display apparatus displaying the color data output from said second synchronizing and interpolating circuit in synchronism with a third synchronizing signals, and said camera displaying an output of said first synchronizing and interpolating circuit, said color data interpolating circuit or said reproducing circuit while synchronizing said output to a vertical timing different from a horizontal timing which implements said relation.

8. A camera in accordance with claim 7, wherein said input and output adjusting circuit comprises:

an input timing generating circuit for generating a drive timing for driving the image pickup device;

a timing adjusting circuit for further adjusting a timing of a signal generated by a drive of the image pickup device; and a synchronizing signal generating circuit for feeding an output timing for said second synchronizing and interpolating circuits, said camera displaying an output of said first synchronizing and interpolating circuit, said color data interpolating circuit or said reproducing circuit while synchronizing said output to a vertical timing different from a horizontal timing which implements said relation.

9. A camera in accordance with claim 8, wherein said input timing generating circuit generates said drive timing over two consecutive lines when the color filters have a Bayer arrangement, said camera displaying an output of said first synchronizing and interpolating circuit, said color data interpolating circuit or said reproducing circuit while synchronizing said output to a vertical timing different from a horizontal timing which implements said relation.

10. A camera in accordance with claim 7, wherein said first synchronizing signal and said second synchronizing signal respectively comprise an input and an output horizontal synchronizing signal included in a prescribed system and are related to each other by an integral multiple, said third synchronizing signal comprising a vertical synchronizing signal included in said prescribed system, said camera displaying an output of said first synchronizing and interpolating circuit, said color data interpolating circuit or said reproducing circuit while synchronizing said output to a vertical timing different from a horizontal timing which implements said relation.

11. A method of controlling a portable display apparatus for displaying, based on a preselected standard, color data output from an image pickup device having pixels arranged in accordance with color filters respectively assigned to three primary colors R, G and B, said method comprising:

a mode switching step for selecting either one of a still picture mode for displaying a single high quality picture by using the color data output from the pixels of the image pickup device and a movie mode for displaying a plurality of pictures by using said color data;

a synchronizing and interpolating step for adjusting, in the movie mode, a timing in such a relation that the color data fed from said image pickup device and color data output are synchronized by an integral multiple, and interpolating void pixels intervening between the pixels of said color data fed to thereby generate a plurality of lines;

a frame storing step for storing, in the still picture mode, the color data fed from the image pick up device in a memory having a capacity greater than a single frame; and a frame interpolating step for interpolating the color data output from said memory, wherein the color data output by synchronizing and interpolating step or said frame interpolating step is fed to a display while being synchronized also to a vertical timing different from said relation.

12. A method in accordance with claim 11, wherein said synchronizing and interpolating step comprises:

a sampling step for sampling one line at a time in response to a first synchronizing signal representative of a timing for taking in the color data fed from the image pickup device;

an output selecting step for selecting a destination to which an output produced by said sampling circuit should be delivered;

an input and output adjusting step for storing the color data output by said output selecting step and outputting said color data at an adjusted timing;

an interpolating step for interpolating, based on an output produced by said input and output adjusting step, color data at positions of void pixels and outputting resulting interpolated color data in synchronism with a second synchronizing signal; and a displaying step for displaying the color data output from said interpolating step in synchronism with a third synchronizing signal.

13. A method in accordance with claim 12, wherein said first synchronizing signal and said second synchronizing signal respectively comprise an input and an output horizontal synchronizing signal included in a prescribed system and are related to each other by an integral multiple, said third synchronizing signal comprising a vertical synchronizing signal included in said prescribed system.

14. A method of controlling a digital still camera operable with a display apparatus for displaying, based on a preselected standard, color data output from an image pickup device having pixels arranged in accordance with color filters respectively assigned to three primary colors R, G and B, said display apparatus comprising:

a mode selector for selecting either one of a still picture mode for displaying a single high quality picture by using the color data output from the pixels of the image pickup device and a movie mode for displaying a plurality of pictures by using said color data;

a first synchronizing and interpolating circuit for adjusting, in the movie mode, a timing in such a relation that the color data fed from the image pickup device and color data to be output are synchronized by an integral multiple, and interpolating void pixels intervening between the pixels of said color data fed to thereby generate a plurality of lines;

a memory having a capacity greater than a single frame for temporarily storing, in the still picture mode, the color data fed from the image pickup device; and a color data interpolating circuit for interpolating the color data output from said memory, said display apparatus feeding the color data output from said first synchronizing and interpolating circuit or said color data interpolating circuit to a display while synchronizing said color data also to a vertical timing different from said relation for synchronizations, said camera comprising:

a recording circuit for recording an output of said first synchronizing and interpolating circuit or said color data interpolating circuit in a recording medium; and a reproducing circuit for reading data out of the recording medium;

said method comprising:

a mode switching step for selecting either one of a still picture mode for displaying a single high quality picture by using the color data output from the pixels of the image pickup device and a movie mode for displaying a plurality of pictures by using said color data;

a synchronizing and interpolating step for adjusting, in the movie mode, a timing in such a relation that the color data fed from said image pickup device and color data output are synchronized to each other by an integral multiple, and interpolating void pixels intervening between the pixels of said color data fed to thereby generate a plurality of lines;

a frame storing step for storing, in the still picture mode, the color data fed from the image pick up device in a memory having a capacity greater than a single frame; and a frame interpolating step for interpolating the color data output from said memory, wherein the color data output by said synchronizing and interpolating step, said frame interpolating step or said reproducing step is fed to a display while being synchronized also to a vertical timing different from a horizontal timing implementing said relation.

15. A method in accordance with claim 14, wherein said synchronizing and interpolating circuit comprises:

a sampling circuit for sampling one line at a time in response to a first synchronizing signal representative of a timing for taking in the color data fed from the image pickup device;

an output selecting circuit for selecting a destination to which an output produced by said sampling circuit should be delivered;

an input and output adjusting circuit for storing the color data output by said output selecting circuit and outputting said color data at an adjusted timing;

a second synchronizing and interpolating circuit for interpolating, based on an output produced by said input and output adjusting circuit, color data at positions of void pixels and outputting resulting interpolated color data in synchronism with a second synchronizing signal; and a displaying circuit for displaying the color data output from said interpolating circuit in synchronism with a third synchronizing signal, wherein the color data output by said synchronizing and interpolating step, said frame interpolating step or said reproducing step is fed to a display while being synchronized also to a vertical timing different from a horizontal timing implementing said relation.

16. A method in accordance with claim 15, wherein said input and output adjusting circuit comprises:

an input timing generating circuit for generating a drive timing for the image pickup device;

a timing adjusting circuit for further adjusting a timing of a signal generated by a drive of the image pickup device; and a synchronizing signal generating circuit for feeding an output timing for said second synchronizing and interpolating circuits, wherein an output of said first synchronizing and interpolating step, said color data interpolating step or said reproducing step is fed to a display while being synchronized also to a vertical timing different from a horizontal timing which implements said relation.

17. A method in accordance with claim 16, wherein said input timing generating circuit generates said drive timing over two consecutive lines when the color filters have a Bayer arrangement, and wherein an output of said first synchronizing and interpolating step, said color data interpolating step or said reproducing step is fed to a display while being synchronized also to a vertical timing different from a horizontal timing which implements said relation.

18. A method in accordance with claim 15, said first synchronizing signal and said second synchronizing signal respectively comprise an input and an output horizontal synchronizing signal included in a prescribed system and are related to each other by an integral multiple, wherein said third synchronizing signal comprise a vertical synchronizing signal included in said prescribed system, and wherein an output of said first synchronizing and interpolating step, said color data interpolating step or said reproducing step is fed to a display while being synchronized also to a vertical timing different from a horizontal timing which implements said relation.

* * * * *